United States Patent [19]

Ford

[11] Patent Number: 4,841,448
[45] Date of Patent: Jun. 20, 1989

[54] WINDSHEAR FLIGHT RECOVERY COMMAND SYSTEM

[75] Inventor: Douglas W. Ford, Hillsboro, Oreg.

[73] Assignee: Flight Dynamics, Inc., Portland, Oreg.

[21] Appl. No.: 92,089

[22] Filed: Sep. 1, 1987

[51] Int. Cl.$^4$ .................. G06F 15/50; G05D 1/08
[52] U.S. Cl. .................... 364/433; 364/434; 244/194; 244/76 C; 244/181; 73/178 T; 340/968
[58] Field of Search .............. 364/431.01, 434, 427, 364/428, 426.04; 340/965–969; 73/178 T; 244/76 R, 76 A, 182, 184, 191, 185, 194, 195, 76 C, 181

[56] References Cited

U.S. PATENT DOCUMENTS

| | | | |
|---|---|---|---|
| 3,860,800 | 1/1975 | Simpson | 364/434 X |
| 4,189,118 | 2/1980 | Peter-Contesse | 244/182 |
| 4,319,219 | 3/1982 | Rein-Weston | 340/968 |
| 4,347,572 | 8/1982 | Berwick, Jr. et al. | 244/182 X |
| 4,390,950 | 6/1983 | Muller | 364/434 |
| 4,422,147 | 12/1983 | Hanke | 244/182 X |
| 4,593,285 | 6/1986 | Miller et al. | 364/434 X |
| 4,609,987 | 9/1986 | Greene | 364/434 X |
| 4,763,266 | 8/1988 | Schultz et al. | 364/435 X |

Primary Examiner—Eugene R. LaRoche
Assistant Examiner—Benny Lee
Attorney, Agent, or Firm—Stoel Rives Boley Jones & Grey

[57] ABSTRACT

The present invention constitutes a system for generating an elevator command signal for directing a pilot in guiding his aircraft along a path effective for recovering from hazardous windshear conditions. The system includes a descending mode guidance subsystem (10), an ascending mode guidance subsystem (12) and a switching mechanism (14) for shifting between the two subsystems. The descending mode subsystem includes an acceleration generator (20), a flight path command generator (22), a flight path error generator (24), a descending mode pitch error generator (26), an airspeed control device (28) and a descending mode signal controller (30). These components are connected serially together and operate to form an elevator command signal corresponding to the acceleration required to halt the descent of the aircraft by a fixed altitude level. They also function to control and condition this signal with respect to important flight parameters such as the aircraft's maximum safe angle of attack and the response capabilities of the pilot and aircraft.

17 Claims, 3 Drawing Sheets

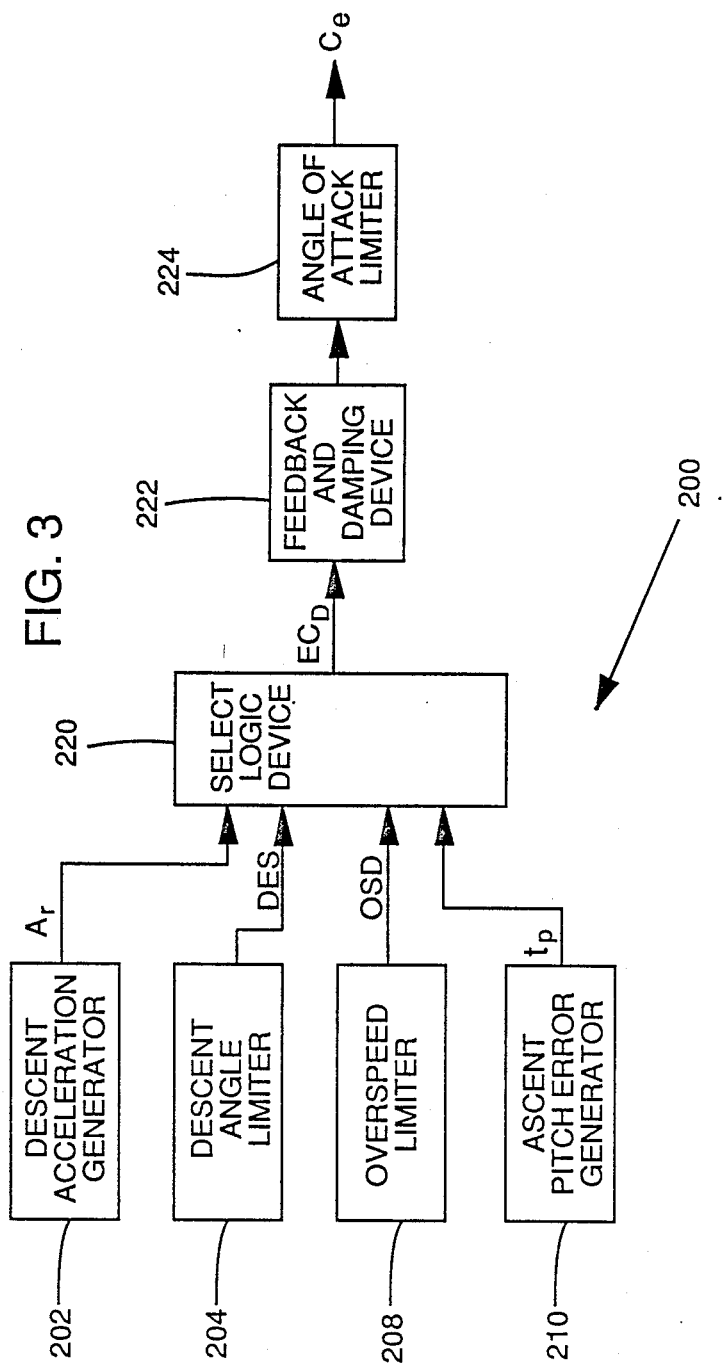

WINDSHEAR FLIGHT RECOVERY COMMAND SYSTEM

BACKGROUND OF THE INVENTION

The present invention relates to avionics systems for aircraft and more particularly to avionics systems for providing guidance to aircraft pilots when they encounter hazardous windshear conditions.

Wind conditions which are rapidly changing over time and/or short distances may cause serious aircraft safety problems. For example, suppose that an aircraft encounters a rapidly diminishing head wind on final approach to landing. As a result of the diminishing wind, the airspeed and lift of the aircraft may be greatly decreased. This can lead to an extremely dangerous situation with the aircraft rapidly losing maneuver capability.

Instrument systems presently exist for detecting windshear conditions. However, in the past, no effective avionics systems have been provided for guiding the pilot of an aircraft in recovering from hazardous windshear conditions. Further, only simple strategies were recommended for recovering from windshear conditions. Aircraft pilots were generally advised upon encountering windshear conditions to go advised upon encountering windshear conditions to go to full rated thrust and to fly the aircraft to its maximum angle of attack and thereby attempt to climb as quickly as possible. However, this solution ignores the problem that when the aircraft is at its maximum angle of attack, it will suffer from substantial drag and will have a reduced stall margin. If the windshear becomes more severe, the pilot may find the aircraft suddenly beyond the point of its safe maximum angle of attack. The performance of the aircraft may thereupon be seriously decreased and the pilot may find himself in a dangerous situation. Consequently, a need exists for an improved strategy for dealing with windshear conditions and a system for providing guidance commands to the pilot for directing the aircraft in recovering from a windshear situation.

It is an object of the present invention to provide an avionics system which embodies an improved strategy for recovering from hazardous windshear conditions affecting an aircraft in flight.

It is a further object of the present invention to provide an avionics system which provides guidance to an aircraft pilot which will allow the pilot to recover from windshear conditions in a safe and effective manner in accordance with the severity of the flight situation of the aircraft.

It is another object of the present invention to provide an avionics system which takes account of several factors affecting the performance of the aircraft in providing an intelligent strategy for recovering the aircraft from a windshear situation.

It is a further object of the present invention to provide an avionics system which supplies guidance directives to an aircraft pilot which are consistent with normal flying techniques and may be easily followed by the pilot in manuevering the aircraft.

SUMMARY OF THE INVENTION

The present invention constitutes a system for generating command signals for guiding a pilot in flying his aircraft along an effective path for recovering from hazardous windshear conditions affecting his aircraft. The system includes two separate command mechanisms for generating alternative elevator command signals. The first command mechanism is operative when the aircraft is descending in altitude under windshear conditions. The second command mechanism is operative when the aircraft is ascending under such conditions. Pitch error signals are formulated to represent either, if the aircraft is descending in altitude, the amount by which the pitch attitude of the aircraft should be changed to arrest its descent by a minimum altitude level or, if the aircraft is ascending, the amount by which the pitch attitude of the aircraft should be changed to maintain a fixed flight path. The pitch error signals are used to form elevator command signals that are suitable for implementation by the pilot. A switching mechanism directs the appropriate descending mode or ascending mode elevator command signals as the final output of the system depending on whether the aircraft is descending or ascending in altitude.

The first command mechanism includes several serially connected components for providing the descending mode elevator command signal. The first component is operative for generating a signal representing the acceleration required for the aircraft to arrest its descent by a selected minimum altitude. This acceleration signal is supplied to a component which uses the signal to generate a flight path command signal which corresponds to the flight path required for the aircraft to implement the acceleration indicated by the acceleration signal.

The flight path command signal is provided to a flight path error generator component which limits the command signal in accordance with certain important flight parameters including the descent angle of the aircraft and the aircraft's angle of attack. The conditioned command signal is provided to a component which employs the conditioned command signal in generating a pitch error signal representing the change in pitch required for the aircraft to follow the command signal. The pitch error signal is in turn supplied to an overspeed control device which adjusts the pitch error to help reduce any airspeed in excess of the aircraft's current flight requirements.

Finally, the pitch error signal, as modified with respect to airspeed is supplied to a control mechanism which includes circuitry for feeding back one or more flight parameters and thereby controlling and damping changes in the pitch error signal. The control mechanism also includes an amplifier component which is operative for forming the final elevator command signal by scaling the pitch error signal in terms of the requirements for its final use in directing a change in position of the aircraft elevators as required to implement the change in pitch indicated by the pitch error signal.

BRIEF DESCRIPTION OF THE DRAWINGS

FIG. 3 is a block diagram showing an alternative operational view of the arrangement of the functional components of the system of the present invention.

DESCRIPTION OF THE PREFERRED EMBODIMENT

Figure 1:
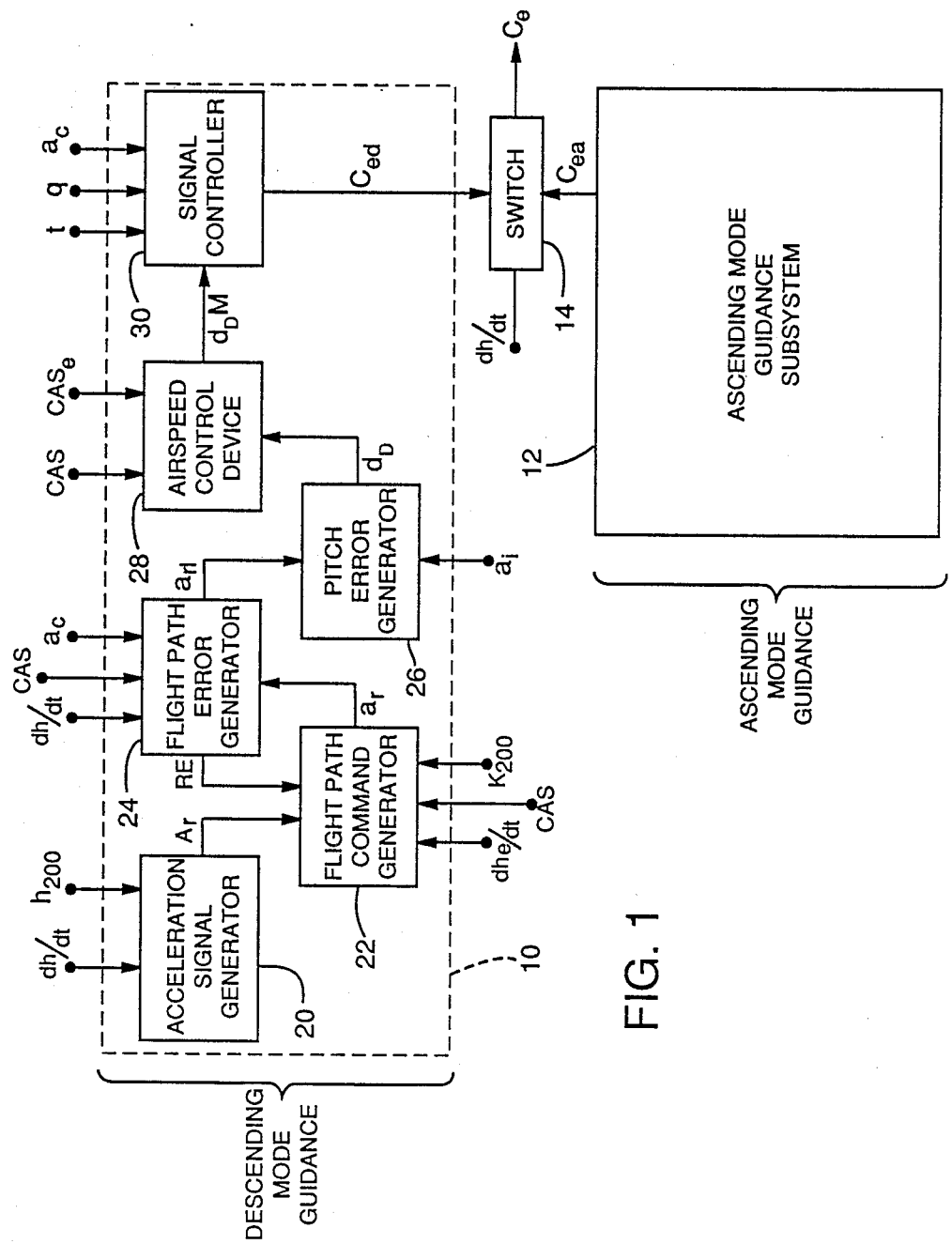
FIG. 1 is a block diagram showing all the functional components comprising the overall system of the present invention.

Referring now to FIG. 1, a block diagram is shown of the overall system of the present invention for providing an elevator command signal $C_e$ effective for directing a pilot in recovering from windshear conditions affecting his aircraft. The system is operatively engaged whenever windshear conditions exceeding a set threshold are encountered by an aircraft in flight as indicated by a suitable windshear detection apparatus. The system includes a descending mode subsystem 10 for providing an elevator command signal $C_{ed}$ for guiding the aircraft during periods when it is descending in altitude and an ascending mode subsystem 12 for providing an elevator command signal $C_{ea}$ for guiding the aircraft during periods when it is ascending in altitude. The descending mode and ascending mode signals $C_{ed}$ and $C_{ea}$ are supplied to the switch unit 14 which directs the appropriate signal as the final output $C_e$ of the overall system depending on the sign of the vertical velocity signal $dh/dt$.

The descending mode subsystem 10 may be considered to comprise six separate components including an acceleration signal generator 20, a flight path command signal generator 22, a flight path error signal generator 24, a pitch error signal generator 26, an airspeed control device 28 and a signal controller 30. The acceleration generator 20 receives a vertical velocity signal $dh/dt$ and a signal $h_{200}$ representing the altitude of the aircraft above the 200 foot altitude level. The generator 20 uses these signals to form an acceleration signal $A_r$ representing the amount of acceleration required for the aircraft to arrest its descent by the 200 foot altitude level.

The acceleration signal $A_r$ is supplied to the flight path command signal generator 22 which also receives the signal $dh/dt$ representing the vertical velocity of the aircraft at the time the windshear recovery guidance system is activated, the signal CAS representing the calibrated (forward) airspeed of the aircraft and a signal $K_{200}$ of constant amplitude. The command generator 22 uses the foregoing inputs to form a command signal $a_r$ which represents the flight path angle which the aircraft should follow in order to implement the acceleration expressed by the signal $A_r$.

The signal $a_r$ is supplied to the flight path error generator 24 which also receives the signals $dh/dt$ representing the vertical velocity of the aircraft, CAS representing the airspeed of the aircraft, and $a_c$ representing the maximum safe angle of attack for the aircraft under current flight conditions. The error generator 24 uses these inputs to limit the amplitude of the signal $a_r$ so that the aircraft will not be directed to follow too steep a descent path or to assume an angle of attack beyond a safe level. The resultant signal $a_{r1}$ produced by the error generator 24 merely corresponds to the signal $a_r$ conditioned so as to be limited with respect to the aircraft's angle of descent and the aircraft's angle of attack. The error generator 24 also provides the signal RE which is supplied to the flight path command generator 22 and effects the production of the flight path command signal $a_r$ whenever it equals the angle of attack limit set by the error generator 24.

The conditioned flight path signal $a_{r1}$ is supplied to the descending mode pitch error generator 26 which also receives the signal $a_i$ representing the current inertial flight path of the aircraft. The generator 26 uses these input signals to form a pitch error output signal $d_D$ representing the amount of change in the pitch attitude of the aircraft required to implement the flight path command signal $a_r$.

The pitch error signal $d_D$ is supplied to the airspeed control device 28 which also receives the input signals CAS and $CAS_e$ which represent the current airspeed of the aircraft and the bug or entry speed of the aircraft whichever happens to be lower. The device 28 employs these input signals to produce a modified pitch error signal $d_DM$ adjusted to direct a higher angle of attack as required to diminish any extra or unnecessary airspeed and convert this airspeed into increased aircraft altitude.

The modified pitch error signal $d_DM$ is supplied to the signal controller 30 which also receives the signals t representing the pitch attitude of the aircraft, q representing the rate of change of the pitch attitude and $a_c$ which correlates with the maximum safe angle of attack for the aircraft. The controller 30 uses the signals t and q to provide feedback to the pitch error signal $d_DM$ and functions to convert the pitch error signal into the elevator command signal $C_{ed}$ for directing the aircraft during descent. The controller 30 also uses the signal $a_c$ to further limit the pitch error signal $d_DM$ to values corresponding to safe angles of attack.

The ascending mode subsystem 12 simply generates a pitch error signal in a conventional manner which directs the aircraft to assume a predetermined pitch attitude which is considered generally optimum for rapid ascent by the aircraft. In particular, ascending mode subsystem 12 receives the pitch attitude signal t and a signal representing the predetermined pitch attitude. The subsystem 12 generates from these symbols an ascending mode pitch error signal corresponding to the difference between the current pitch attitude of the aircraft and the predetermined pitch attitude. The subsystem 12 may also include a flap speed control device operative for preventing the aircraft from exceeding the placard speed for its current flaps configuration.

Figure 2:
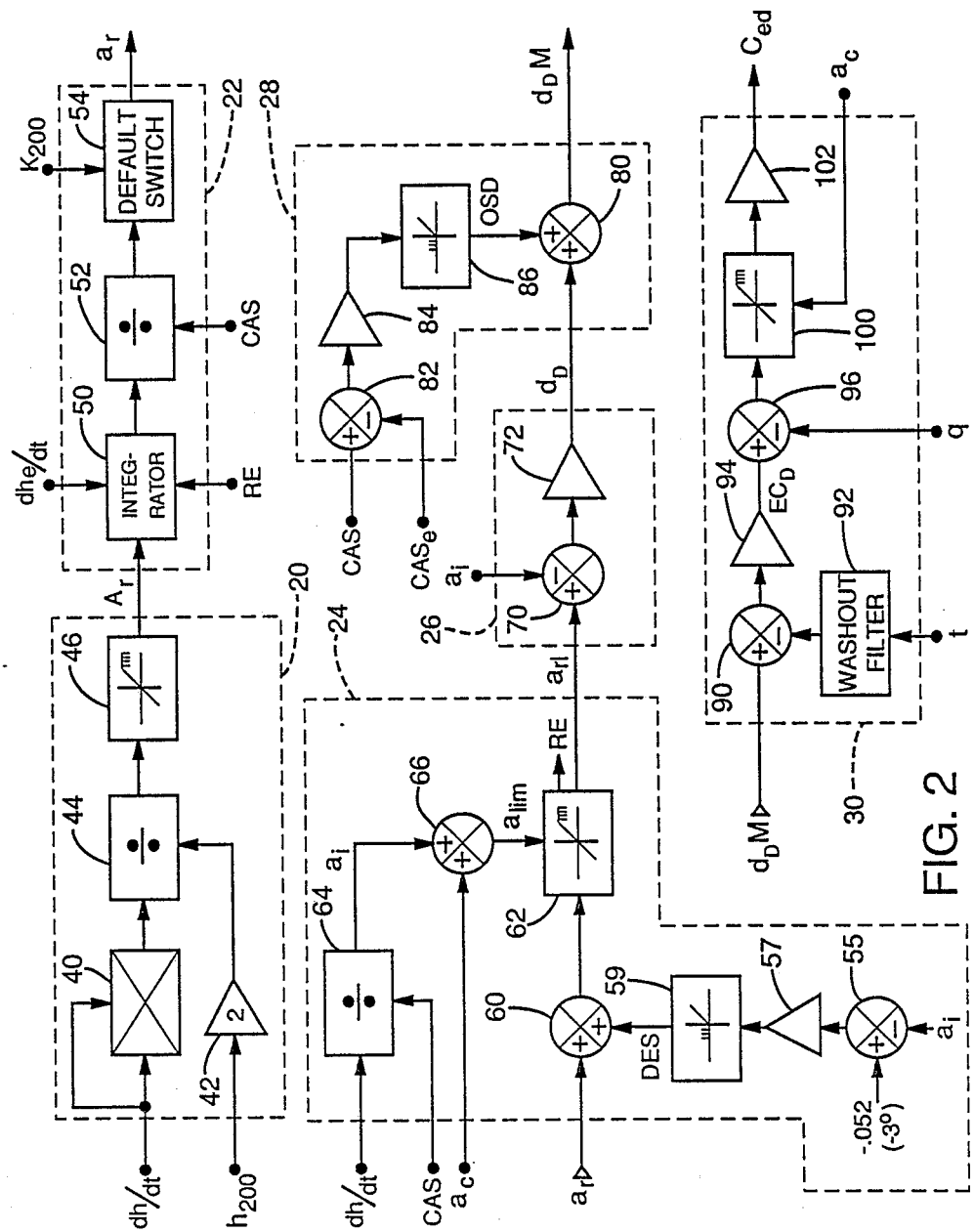
FIG. 2 is a detailed block diagram showing the circuit components of the descending mode subsystem of the present invention.

Referring now to FIG. 2, the descending mode guidance subsystem 10 and its components are shown in greater detail. The acceleration generator 20 includes the multiplier circuit 40, the amplifier circuit 42, the divider circuit 44, and the limiter circuit 46. The acceleration generator 20 is designed to provide an output signal $A_r$ representing the constant amount of acceleration necessary to halt the descent of the aircraft by the 200 foot altitude level. The 200 foot level is considered the approximate minimum safe altitude for arresting the descent of the aircraft. The required acceleration is equal to the square of the vertical velocity of the aircraft divided by twice the vertical distance from the aircraft to the 200 foot altitude level. This amount of acceleration is considered desirable because it provides a smooth and constant deceleration in the vertical direction which is relatively easy for the pilot to follow with the aircraft. The multiplier circuit 40 squares the signal $dh/dt$ and provides an output signal corresponding to the square of $dh/dt$ to the divider circuit 44. The amplifier circuit 42 scales the signal $h_{200}$ and provides an appropriately scaled (i.e., doubled) output signal corresponding to $h_{200}$ to the divider circuit 44. The divider circuit 44 generates an output signal corresponding to the quotient of the square of the vertical velocity as supplied by the multiplier circuit 42 divided by the distance to the 200 foot altitude level as supplied by the amplifier circuit 42. The output signal from the divider 44 represents the desired amount of constant acceleration necessary to arrest the descent of the aircraft by the 200 foot altitude level. However, this acceleration must remain within the stress limits of the physical structure of the aircraft. The output signal from the divider circuit is, therefore, supplied to the limiter circuit 46 where its amplitude is limited to quantities corresponding to no more than 1.5 gravitational acceleration units. The output signal from the limiter circuit 46 is the required constant acceleration signal $A_r$ which is supplied to the flight path command generator 22.

The integrator circuit 50 receives the acceleration signal $A_r$ and sums this signal over time starting with the initial vertical velocity of the aircraft at the time of activation of the windshear recovery guidance system as represented by the input signal $dh_e/dt$ which effectively serves as the integration constant for the integration process. The output of the integrator circuit 50 represents the change in vertical velocity required over time to implement the acceleration represented by the acceleration signal $A_r$. The integration process of the circuit 50 is subject to being restarted (by the signal RE from generator 22) under selected conditions which will be described later with respect to the limiter circuit 62 of the flight path error generator 24. The divider circuit 52 receives the output signal from the integrator 50 as an input and forms an output signal by dividing the amplitude of the vertical velocity signal by the amplitude of a signal CAS representing the calibrated airspeed of the aircraft. The output signal from the divider circuit 52 represents the flight path required for the aircraft to follow the acceleration expressed in the signal $A_r$.

However, if the aircraft is below 200 feet in altitude, an entirely different approach is required in accordance with the seriousness of the aircraft's flight situation. This approach is provided by the default switch circuit 54. The default switch circuit 54 receives, and ordinarily transmits, the output of the divider circuit 52 except when the altitude of the aircraft is below 200 feet in which case the switch 54 transmits a constant level signal $K_{200}$ calculated to provide a pitch error signal from control device 28 corresponding to approximately 6° regardless of other conditions.

In any event, the output of the default switch unit 54 is provided to the adder circuit 60 which in cooperation with the adder 55, the amplifier circuit 57, and the limiter circuit 59 functions to limit the flight path command signal $a_r$ to values corresponding to flight paths greater than 3 degrees below horizontal ($-3°$). This helps to ensure that the path of the aircraft remains within the limits of a normal landing approach and that the path will be, therefore, free from any obstacles. The adder 55 differences a signal $a_i$ representing the inertial flight path of the aircraft with a signal corresponding to a fixed $-3°$ flight path angle ($-0.052$ radians). The resulting sum represents the quantity ($-a_i - 3°$) which becomes positive in value only if the inertial flight path is inclined at an angle of less than a $-3°$ descent path. The amplifier circuit 57 scales the output signal from the adder 55 as appropriate for use in combination with the command signal $a_r$. The limiter 59 limits the signal from the scaler 57 to positive values only. The signal DES provided by the limiter 59, therefore, represents the amount by which the inertial flight path of the aircraft is currently less than $-3°$ below horizontal. This signal from the limiter 59 is then summed with the flight path command signal $a_r$ in the adder 60 in order to thereby ensure that the command signal $a_r$ directs a flight path greater than 3° below horizontal.

The command signal as limited by the limiter circuit 60 is in turn supplied from the circuit 60 to the limiter circuit 62 which provides a different type of limiting function. The circuit 62 limits the command signal to values which do not exceed the safe maximum angle of attack of the aircraft under current flight conditions. This upper limit on the command signal is a variable limit which s calculated through the action of the divider circuit 64 and the adder circuit 66.

The divider circuit 64 forms a quotient by dividing a signal $dh/dt$ representing the vertical velocity of the aircraft by a signal CAS representing the calibrated forward airspeed of the aircraft. The resultant quotient corresponds to the current inertial flight path of the aircraft. A signal $a_i$ representing this quotient is supplied by the divider circuit 64 to the adder circuit 66 which also receives a signal $a_c$ which represents the difference between the maximum safe angle of attack of the aircraft under current flight conditions and the actual current angle of attack of the aircraft. The adder 66 sums the two signals $a_i$ and $a_c$ to provide an output signal $a_{lim}$ which represents the maximum angular flight path which the aircraft can assume without exceeding the maximum safe angle of attack of the aircraft under current flight conditions. The signal $a_{lim}$ is supplied from the adder circuit 66 to the limiter circuit 62 and sets the upper limit of the bounding function provided by the limiter circuit 62.

The limiter circuit 62 provides a conditioned command signal $a_{rl}$ which is limited with respect to the safe angle of attack of the aircraft. However, the limiter circuit 62 also provides another function in association with the integrator circuit 50. Whenever the signal $a_r$ is equal to the value of the variable limit $a_{lim}$ the limiter circuit 62 provides a restart signal RE to the integrator circuit 50. This restart signal is provided to the circuit 50 because whenever the limiter circuit 62 is active in limiting the command signal $a_r$ the continuity of the flight recovery process is thereby interrupted.

The conditioned command signal $a_{rl}$ is received by the adder circuit 70 which also receives a signal representing the inertial flight path $a_i$ of the aircraft as calculated by the divider circuit 64. The adder circuit 70 differences the command signal $a_{rl}$ with the signal $a_i$ representing actual flight path of the aircraft in order to form a signal corresponding to the change in flight path required for the aircraft to follow the acceleration represented by the signal $A_r$. The amplifier circuit 72 receives the output signal from the adder 70 representing the required change in flight path and scales this signal in terms of the necessary change in pitch attitude of the aircraft required to adjust the flight path of the aircraft. The amplifier circuit 72 thereby generates a pitch error signal $d_D$ for directing the aircraft to follow a flight path consistent with the acceleration signal $A_r$.

The pitch error signal $d_D$ is supplied to the adder circuit 80 of the airspeed control device 28 which also receives a correction signal from the combination of the adder circuit 82, amplifier circuit 84, and limiter circuit 86. The adder circuit 82 differences a signal CAS representing the calibrated forward airspeed of the aircraft with a signal $CAS_e$ representing either the lower of the bug speed or the entry speed of the aircraft. The output signal from the adder circuit 82, therefore, represents an airspeed error corresponding to an amount of "extra" speed for the aircraft in view of its current flight requirements. This signal is applied to the amplifier circuit 84 which scales the signal in terms of the change in pitch attitude required to diminish this excess speed over a reasonably short period of time and concurrently convert this speed into aircraft altitude. The output from the amplifier circuit 84 is fed to the limiter circuit 86 which limits the amplitude of the signal to values representing positive changes in pitch and, therefore, increased angles of attack. The adder circuit 80 sums the signal $d_D$ representing pitch error and the overspeed pitch correction signal OSD from the limiter circuit 86 to provide a signal $d_DM$ corresponding to a pitch error modified to account for any extra speed of the aircraft and to thereby maintain the aircraft within its most efficient range of airspeed.

The modified pitch error signal $d_DM$ is supplied to the adder circuit 90 of the descending mode controller 30. The adder circuit 90 also receives an input signal from the washout filter circuit 92. The washout filter circuit 92 processes a signal t representing the current pitch attitude of the aircraft to provide an output to the adder circuit 90 corresponding only to the high frequency components of the pitch attitude signal. The adder circuit 90 differences the pitch error signal $d_DM$ with the output of the washout filter circuit 92 thereby providing feedback to the pitch error signal. The adder circuit 90 and the washout filter circuit 92 function to provide displacement damping with respect to rapid variations in the pitch error signal $d_DM$. The output of the adder circuit 90 is supplied to the amplifier circuit 94 which scales the pitch error signal from the adder circuit 90 in terms of the change in position of the elevators of the aircraft required to provide a selected rate of change in aircraft pitch attitude in accordance with the magnitude of the pitch error signal. The output signal $EC_D$ from the amplifier circuit 94 represents a pitch rate command signal and is supplied to the adder 96 which also receives an input signal q corresponding to the rate of change of the pitch attitude of the aircraft. The adder circuit 96 differences the pitch rate command signal from the amplifier 94 with the signal q representing the rate of change of pitch thereby providing a velocity feedback and damping function with respect to the pitch rate command signal $EC_D$ The output from the adder circuit 96 is supplied to the limiter circuit 100. The limiter circuit 100 also receives an input signal $a_c$ corresponding to the difference between the maximum safe angle of attack of the aircraft and the current actual angle of attack of the aircraft. This signal is used to set a maximum limit for the pitch rate command signal. This variable upper limit helps to ensure that the pitch rate command signal will not assume too large an amplitude if the aircraft is approaching its maximum safe angle of attack. It should be noted that while the limiter circuit 100 provides a function similar to limiter circuit 62, it also takes account of inputs and additions to the pitch error signal $d_D$ and pitch rate command signal $EC_D$ which may be made during processing in the airspeed control device 28 and in the descending mode controller 30. The limiter circuit 100 supplies its limited pitch rate command signal to the amplifier 102 which scales this signal in terms of its final use requirements thereby forming the final elevator command output signal $C_{ed}$ which is supplied to the switch unit 14.

Referring now to FIG. 3, the operation of the present invention can be viewed in terms of the system 200. The components 202, 204, 208, and 210 provide various inputs to the select logic device 220 which the device 220 may alternatively utilize in producing an elevator command signal. These inputs represent parameters related to providing appropriate guidance to the pilot for recovering from a windshear situation and for alternatively protecting the aircraft in other ways.

The descent acceleration generator provides an acceleration signal $A_r$ which represents the amount of acceleration necessary to arrest the descent of the aircraft by the 200 foot altitude level. Under ordinary conditions this should be the primary signal used as a basis to produce an elevator command signal for the pilot during descent in a windshear situation. However, the components 204 and 208 may provide overriding signals related to other important factors. The descent angle limiter 204 provides a signal DES which in appropriate circumstances limits the descent angle of the aircraft to angles greater than approximately $-3°$ degrees below horizontal. The overspeed limiter 208 provides a signal OSD which increases the pitch attitude of the aircraft to utilize any excess airspeed in gaining altitude. The ascent pitch error generator 210 provides a signal $t_p$ which represents the change in pitch (pitch error) required for the aircraft to assume a predetermined upward climb angle. Under ordinary conditions, this should be the primary signal used as a basis for producing an elevator command signal for the pilot during ascent in a windshear situation. The select logic device 220 chooses the appropriate signal for use in generating a or ascending mode elevator command signal depending on conditions.

The feedback and damping device 222 simply processes the pitch rate command signal $EC_D$ from the device 220 to form an elevator command signal which may easily be followed by the pilot with the aircraft. The angle of attack limiter 224 provides a check to ensure that the elevator command signal never directs an angle of attack greater than the aircraft's maximum safe angle of attack so as to preclude the possibility of stall. The operation of the present invention can therefore be seen as involving the alternative use of competing control parameters. Different control signals are utilized in providing an elevator command signal during descent and ascent. Furthermore, during descent, a basic "acceleration" signal may be superseded by descent angle and overspeed control signals. These alternative signals protect the aircraft from descent angles which are too steeply inclined and from airspeeds which are unnecessarily fast.

As may be apparent from the preceding description, certain changes may be made in the above constructions without departing from the scope of the invention. Therefore, the embodiment described and the drawings are intended to be illustrative in nature and are not meant to be interpreted as limiting the following claims.

I claim:

1. A system for generating an elevator command guidance signal for directing an aircraft during descent to recover from a windshear condition, the flight parameters characterizing the descent of said aircraft including airspeed, vertical velocity, pitch attitude, and a first flight path, said system comprising:

acceleration signal generating means receiving signals representing a predetermined altitude and said vertical velocity for generating an acceleration signal representing an acceleration by which said aircraft can arrest its descent by said predetermined altitude;

flight path command signal generating means receiving said acceleration signal and an airspeed signal representing said airspeed for generating a flight path command signal that represents a second flight path by which said aircraft can implement said acceleration and that is proportional to a ratio of said airspeed signal and an integral over time of said acceleration signal;

pitch error signal generating means receiving said flight path command signal and a first flight path signal respresenting said first flight path for generating a pitch error signal by differencing said flight path command signal with said first flight path signal; and signal controlling means receiving said pitch error signal and a pitch attitude signal representing said pitch attitude for adjusting said pitch error signal in accordance with said pitch attitude signal, thereby to form said elevator command guidance signal that is corrected for said pitch attitude of said aircraft.

2. The system of claim 1, further comprising:

airspeed control means receiving said pitch error signal and said airspeed signal for adjusting said pitch error signal in accordance with said airspeed signal to compensate said pitch error signal for any overspeed by said aircraft.

3. The system of claim 1, in which said pitch attitude changes at a rate and said signal controlling means receives pitch attitude rate of change signal representing said rate, said signal controlling means further adjusting said pitch error signal in accordance with said pitch attitude rate of change signal to form said elevator command guidance signal that is corrected for said pitch attitude rate of change.

4. The system of claim 1 in which said aircraft has a maximum safe angle of attack and said signal controlling means includes means for limiting said pitch error signal so that it does not represent an angle of attack that exceeds said maximum safe angle of attack.

5. The system of claim 1, further comprising:

flight path limiting means receiving said flight path command signal for limiting it to values representing angles of no less than a predetermined angle below horizontal with respect to ground.

6. The system of claim 1 in which said flight path command signal generating means integrates said acceleration signal over time to form a resulting signal that is divided by said airspeed signal to form said flight path command signal.

7. A system for generating an elevator command guidance signal for directing an aircraft in flight to recover from a windshear condition, the parameters characterizing the flight of said aircraft including airspeed, vertical velocity, pitch attitude, and a first flight path, said system comprising:

means receiving signals corresponding to said vertical velocity, airspeed, and first flight path for generating when said aircraft is descending in altitude a pitch error signal representing the difference between said first flight path signal and a flight path command signal, the flight path command signal being generated from said vertical velocity and airspeed signals and representing a second flight path by which said aircraft can arrest its descent by a predetermined altitude;

airspeed control means receiving said pitch error signal and said airspeed signal for adjusting said pitch error signal in accordance with said airspeed signal to compensate said pitch error signal for any overspeed by said aircraft; and signal controlling means receiving said pitch error signal and a pitch attitude signal representing said pitch attitude for adjusting said pitch error signal in accordance with said pitch attitude signal, thereby to form an elevator command guidance signal that is corrected for said pitch attitude of said aircraft.

8. The system of claim 7, wherein said means for generating a pitch error signal, includes:

acceleration signal generating means receiving said vertical velocity signal and a signal representing said predetermined altitude for generating an acceleration signal representing an acceleration by which said aircraft can arrest its descent by said predetermined altitude, and flight path command signal generating means receiving said acceleration signal and said airspeed signal for generating a flight path command signal that represents said second flight path and is proportional to a ratio of said airspeed signal and an integral over time of said acceleration signal.

9. The system of claim 8, wherein said means for generating a pitch error signal further includes flight path limiting means receiving said flight path command signal for limiting it to values representing angles no less than a predetermined angle below horizontal with respect to ground.

10. The system of claim 7, in which a predetermined pitch attitude is optimum for providing rapid ascent of said aircraft, said system further comprising means for generating when said aircraft is ascending in altitude a pitch error signal representing a difference between said pitch attitude of said aircraft and said predetermined pitch attitude.

11. The system of claim 7, wherein said pitch attitude changes at a rate and said signal controlling means receives a pitch attitude rate of change signal representing said rate, said signal controlling means further adjusting said pitch error signal in accordance with said pitch attitude rate of change signal to form said elevator command signal that is corrected for said pitch attitude rate of change.

12. A method for generating an elevator command guidance signal adapted for guiding a pilot of an aircraft in flight during a windshear condition, the parameters characterizing the flight of said aircraft including airspeed, vertical velocity, angle of attack, pitch attitude, and a first flight path, said method comprising the steps of:

receiving signals corresponding to said airspeed, vertical velocity, first flight path, angle of attack, and pitch attitude;

generating when said aircraft is in descent a pitch error signal representing the difference between said first flight path signal and a flight path command signal, the flight path command signal being generated from said vertical velocity and airspeed signals and representing a second flight path by which said aircraft can arrest its descent by a predetermined altitude;

limiting said pitch error signal to values no greater than the difference between said angle of attack signal and a signal representing a predetermined maximum angle of attack for said aircraft; and adjusting said pitch error signal in accordance with said pitch attitude signal, thereby to form said elevator command guidance signal that is corrected for said pitch attitude of said aircraft.

13. The method of claim 12, further including the step of adjusting said pitch error signal in accordance with said airspeed signal to compensate said pitch error signal for any overspeed by said aircraft.

14. The method of claim 12, wherein said step of generating a pitch error signal includes the substeps of:
generating from said vertical velocity and airspeed signals an acceleration signal representing an acceleration by which said aircraft can arrest its descent by said predetermined altitude; and
computing a ratio of said airspeed signal and an integral over time of said acceleration signal to form a signal corresponding to said flight path command signal.

15. The method of claim 14 in which said acceleration signal is integrated over time to form a resulting signal that is divided by said airspeed signal to form said flight path command signal.

16. The method of claim 12, further including the step of limiting said flight path command signal to values representing angles greater than a predetermined angle below horizontal with respect to the ground.

17. A system for generating a guidance signal for directing a descending aircraft to recover from a windshear condition, the parameters characterizing the descent of said aircraft including airspeed, vertical velocity, and a first flight path, comprising:
means receiving signals corresponding to said vertical velocity, airspeed, and first flight path for generating a pitch error signal representing the difference between said first flight path signal and a flight path command signal, the flight path command signal being generated from said vertical velocity and airspeed signals and representing a second flight path by which said aircraft can arrest its descent by a predetermined altitude;
means for preventing said pitch error signal from assuming values that exceed a predetermined angle corresponding to a maximum safe angle of attack of said aircraft;
means for adjusting said pitch error signal in accordance with said airspeed signal, thereby to compensate said pitch error signal for any airspeed in excess of said aircraft's normal flight requirements; and
means for limiting said flight path command signal to values corresponding to descent angles greater than a predetermined level below horizontal.

* * * * *

UNITED STATES PATENT AND TRADEMARK OFFICE
CERTIFICATE OF CORRECTION

PATENT NO. : 4,841,448

DATED : June 20, 1989

INVENTOR(S) : Douglas W. Ford

It is certified that error appears in the above-identified patent and that said Letters Patent is hereby corrected as shown below:

Column 1, lines 26 and 27, after "generally" delete the phrase "advised upon encountering windshear conditions to go" (second occurrence).

Column 1, line 61, change "manuevering" to --maneuvering--.

Column 2, line 47, change "airspeed" to --airspeed,--.

Column 3, line 36, change "dh/dt" to $--dh_e/dt--$.

Column 6, line 8, change "s" to --is--.

Column 7, line 42, change "$EC_D$" to --$EC_D$.--

Column 8, line 28, after "a" insert --descending--.

Claim 3, column 9, lines 27 and 28, after "receives" insert --a--.

Signed and Sealed this

Eighth Day of May, 1990

*Attest:*

HARRY F. MANBECK, JR.

*Attesting Officer*     *Commissioner of Patents and Trademarks*